United States Patent [19]
Wallace

[11] 4,049,333
[45] Sept. 20, 1977

[54] MAGNETIC RADIO MOUNTING BRACKET

[76] Inventor: Dewey K. Wallace, 812 Wateka, Richardson, Tex. 75080

[21] Appl. No.: 672,186

[22] Filed: Mar. 31, 1976

[51] Int. Cl.² .............................................. H01R 11/30
[52] U.S. Cl. ............................ 339/12 R; 211/DIG. 1; 248/206 A; 339/10
[58] Field of Search .................... 339/12 R, 12 G, 10; 248/206 A, 206 R, 200, 205 R; 211/DIG. 1

[56] References Cited
U.S. PATENT DOCUMENTS

| | | | |
|---|---|---|---|
| 3,126,190 | 3/1964 | Miller | 248/206 A |
| 3,706,882 | 12/1972 | Eby | 339/10 |

Primary Examiner—Gerald A. Dost
Assistant Examiner—DeWalden W. Jones
Attorney, Agent, or Firm—Howard E. Moore; Gerald G. Crutsinger

[57] ABSTRACT

A detachable radio mount for a vehicle comprising a dash bracket bolted or otherwise secured to the dash of a vehicle and a radio bracket bolted or otherwise secured to a radio or other communication device. Bar magnets are secured in ferrous metal brackets which are secured to the dash bracket such that a magnetic circuit is formed from the north to the south pole of the magnets increasing the magnetic flux of the magnet in the area surrounding the magnet. Ferrous metal plates having a width equal to the width of the ferrous metal brackets on the dash bracket and being approximately two times the thickness of the ferrous metal brackets are secured to the radio bracket by adhesive or other means such that magnetic force pulls the ferrous metal plates toward the bar magnets and ferrous metal brackets. A magnetic bond is formed between the magnets and the ferrous metal plates having suffcient strength to hold a radio and which may be separated therefrom only by sliding the steel plates longitudinally relative to the bar magnets. Electrical connections are provided through the ferrous metal bracket on the dash bracket and the metal plates on the radio bracket since ferrous metal is a conductor of electricity.

10 Claims, 5 Drawing Figures

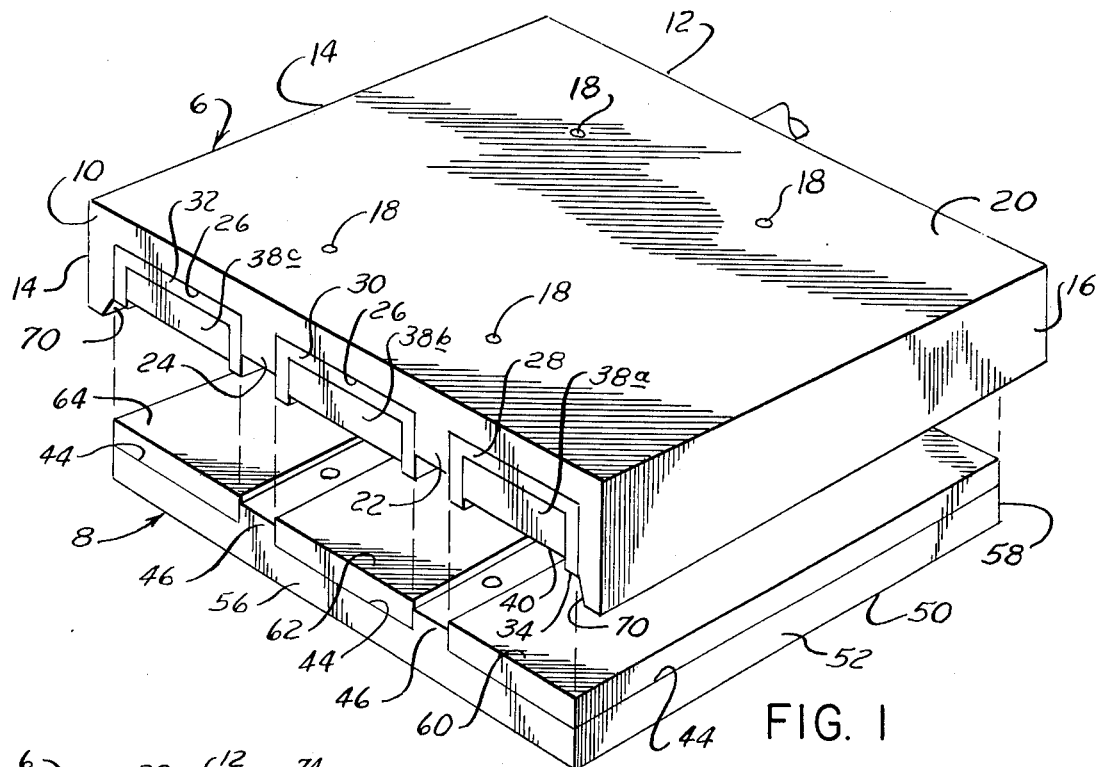
FIG. 1
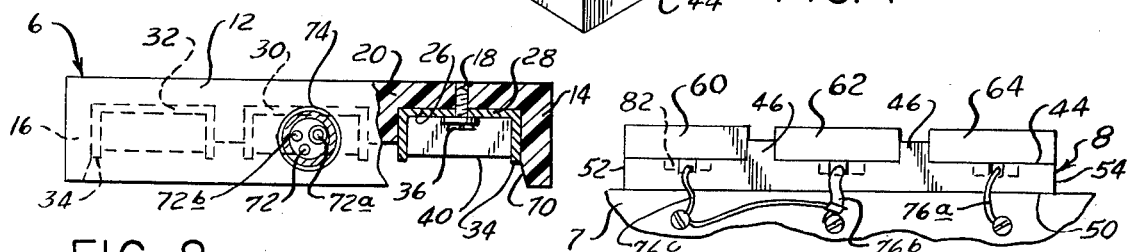
FIG. 2
FIG. 3
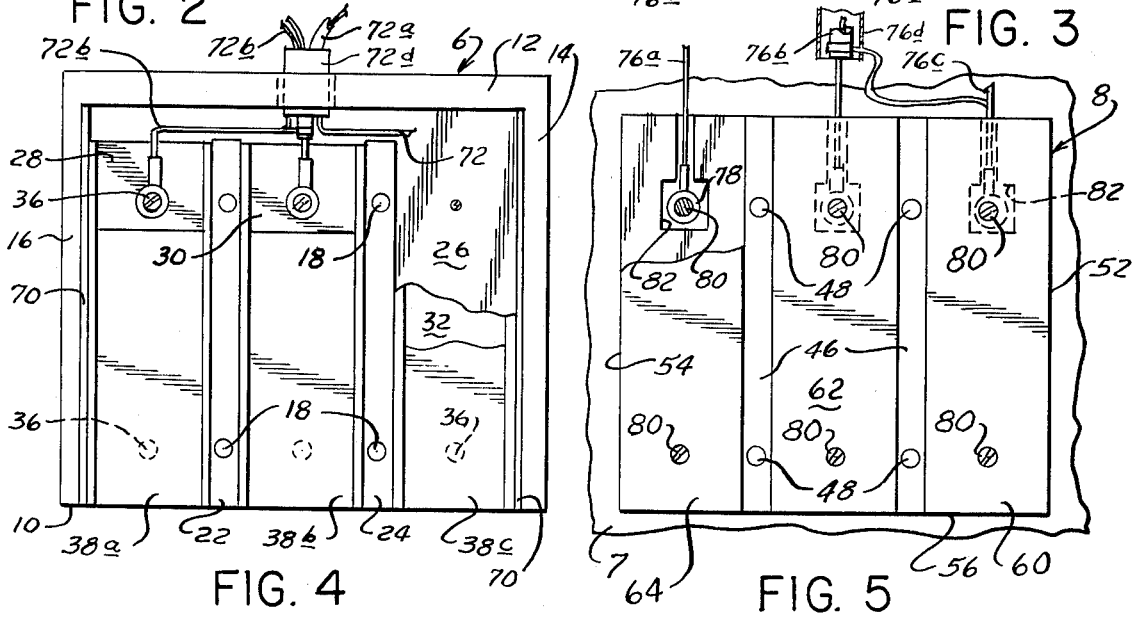
FIG. 4
FIG. 5

MAGNETIC RADIO MOUNTING BRACKET

BACKGROUND OF THE INVENTION

Today's mobile society has brought about an increased popularity of more sophicated communication devices such as CB radios, tape decks, FM stereo radios and other communication devices. Along with the popularity of these devices an increase in theft of these devices has developed due to the ease of removal and sale of the devices. One way to reduce the likelihood of theft of the devices from a vehicle is to provide a removable mounting bracket so that the device may be taken with the owner or placed in an inaccessible place such as the trunk of the automobile.

Removable brackets heretofore have been of the mechanical type which have electrical contacts having very small area dimensions. One problem with these mechanical devices is that vibration in the automobile will often momentarily break the contact between the dash bracket and the radio bracket which on some devices may cause substantial damage to the device, such as on a CB radio.

SUMMARY

I have devised a magnetic mounting bracket for radios or other electronic devices which comprises a dash bracket having bar magnets secured in a C-shaped ferrous metal channel to increase the magnetic flux of the bar magnet and a radio bracket having ferrous metal plates aligned and adapted to engage the C-shaped ferrous metal bracket. The radio bracket is secured to the top of the radio or other communication device and the dash bracket is secured to the underside of the dash or other suitable object in a vehicle.

The electrical connections on the dash bracket are secured to each C-shaped metal bracket which will conduct electricity such that when the plates on the radio bracket engage the C-shaped bracket an electrical circuit is made through the C-shaped brackets and the plates on the radio bracket to the radio.

A primary object of the invention is to provide a detachable radio mounting bracket which will not vibrate loose when the vehicle is in motion to prevent damage from occuring to the electronic communication device attached thereto.

A further object of the invention is to provide a magnetic radio holding bracket which cannot be separated by pulling the radio bracket from the dash bracket such that the brackets can only be separated by sliding the radio bracket relative to the longitudinal axis of the bar magnets.

A further object of the invention is to provide a radio mounting bracket which is removable such that the electronic communication device may be placed in a more secure position to prevent theft of the device.

A still further object of the invention is to provide a device in which the electric connections between the dash and the radio are achieved by the strong bond of the magnet such that the contact points cannot be separated which might damage or cause malfunctioning of the electronic communications device.

Other and further objects of the invention will become apparent upon a detailed study of the description following and by referring to the drawings annexed hereto.

DESCRIPTION OF THE DRAWINGS

Drawings of a preferred embodiment of the invention are annexed hereto so that the invention maybe more fully understood, in which:

FIG. 1 is a frontal perspective exploded view of the dash bracket and radio bracket;

FIG. 2 is a rear elevational view of the dash bracket with parts broken away to more fully illustrate the details of construction;

FIG. 3 is a rear elevational view of the radio bracket;

FIG. 4 is a bottom plan view of the dash bracket with parts broken away to more clearly illustrate the details of construction; and FIG. 5 is a top plan view of the radio bracket with parts broken away to more clearly illustrate the details of construction.

Numeral references are used to designate the parts shown in the drawings and like numerals designate like parts throughout the various figures of the drawings.

DESCRIPTION OF A PREFERRED EMBODIMENT

Referring to FIG. 1 of the drawing, the numeral 6 designates a dash bracket which is bolted or otherwise secured to a dash in a vehicle (not shown). A radio bracket 8 is aligned with the dash bracket 6 and may be bolted or otherwise secured to a communication device such as a CB radio, tape deck, FM stereo radio or other listening devices indicated by the numeral 7.

The dash bracket 6 and radio bracket 8 are constructed of non-ferrous, non-electrically conductive material such as bakelite or polyvinyl chloride plastics.

The dash bracket 6 has a front side 10 and a rear side 12 connected by sides 14 and 16 which extend downwardly. Rear side 12 extends downwardly to limit the movement of radio bracket 8 to rear side 12.

Holes 18 are formed in the upper side 20 of dash bracket 6 for passage of screws to attach the dash bracket 6 to a vehicle (not shown).

Partitions 22 and 24 form channels 26 on the lower edge of dash bracket 6.

As most clearly illustrated in FIGS. 1, 2 and 4, ferrous metal channels 28, 30 and 32 are secured by screws 36 in channels 26 to bracket 6 between partitions 22 and 24 and sides 14 and 16 of dash bracket 6. The C-shaped channels 28–32 have edges 34 which extend downwardly.

Bar magnets 38a, 38b and 38c are secured in channels 28, 30, and 32 by adhesive or the like and are constructed such that the exposed lower edge 40 of each magnet does not extend to the edges 34 of C-shaped ferrous metal channels 28, 30 and 32 thus forming channels therebetween to receive bars 60, 62 and 64.

It should be readily apparent that each of the permanent bar magnets has a north pole and a south pole in which magnetic flux or a magnetic field flows from the north pole to the south pole forming a magnetic circuit. If iron or other ferrous metal is provided to connect the north pole with the south pole, the magnetic flow in the magnetic circuit is increased and the magnetic flux or density of the magnet is increased thus increasing the power of the magnet.

It should be readily apparent that the C-shaped metal channels 28, 30 and 32 connect the north and south pole of magnets 38a, 38b, and 38c forming a magnetic circuit which increases the pull of the magnets and also magnetizes the C-shaped ferrous metal brackets 28, 30 and 32.

The radio bracket 8 has channels 44 formed therein with partitions 46 formed therebetween. The radio bracket 8 may be secured by screws through passages 48 or self-sticking adhesives strips (not shown) attached to the lower side 50 of bracket 8. Bracket 8 has sides 52 and 54 spaced from ends 56 and 58.

Ferrous metal plates 60, 62 and 64 are secured in channels 44 of radio bracket 8 by adhesive, screws or the like. As viewed in FIGS. 2 and 3, the thickness of the metal plates 60-64 is approximately twice the thickness of edges 34 of C-shaped metal channels 28, 30 and 32. In addition, the width of ferrous metal plates 60, 62 and 64 is preferably equal to the width of C-shaped channels 28, 30 and 32 to provide optimum magnetic connection between the dash bracket 6 and radio bracket 8.

It should be readily apparent that sides 52 and 54 are slideably disposed within sides 14 and 16 of dash bracket 6 which is provided with bevelled edges 70 to facilitate alignment of the lower radio bracket with the upper dash bracket. In addition, it should be readily apparent that the partitions 22, 24 and 26 of the dash bracket 6 and radio bracket 8 are constructed such that the respective partitions do not engage each other.

Suitable electrical ground and antenna connections are secured between the vehicle (not shown) and the dash bracket 6 by securing power wire 72, ground wire 72b and coaxial antenna cable 72a, as best illustrated in FIGS. 2 and 4, through a passage 74 in bracket 6 and securing them to screws 36 on the rear side 12 of dash bracket 5 by clips 76. It should be readily apparent that suitable electrical connections would be dependent upon the type of electronic communication device installed; for example, a CB radio would require grounded coaxial shielded cable 72a for an antenna to channel 30, a 12 volt DC power line 72 to channel 32 and a ground connection 72b to channel 28.

Suitable electrical and antenna connections are made through power line 76a ground cable 76c and coaxial antenna cable 76b and clips 78 to plates 60, 62 and 64 through screws 80. Recesses 82 are formed between the plates and the channels 44 of lower radio bracket 8 to provide a flat surface for the plates to pass over. Lines 76a are connected to communications device 7 (shown in dashed outline) by suitable connectors, giving a 12 volt source to plate 64 ground connection to plate 60 and antenna connection to plate 62.

Operation of the hereinbefore described device is as follows:

The dash bracket 6 is attached by means of screws or other attachment means through passages 18 to the vehicle. The radio bracket 8 is attached by screws or other fastening means through passages 48 or by a self-adhesive tape to the top of the radio 7. The electrical connections are made to the antenna, the power source, and ground or other suitable electrical connections necessary through power wire 72, ground wire 72b and coaxial cable 72a. The radio or other communication device with the radio bracket 8 attached thereto is then hand lifted toward dash bracket 6 until edges 52 and 54 of the lower radio bracket 8 is aligned by bevelled edges 70 such that plates 60, 62 and 64 engage C-shaped metal channels 28, 30 and 32 on dash bracket 6, thus securing the lower bracket 8 to the upper bracket 6 by magnetic attraction. Thus, power is supplied to the transceiver through power wire 72, magnet 38c and plate 64 and channel 32 and wire 76a; ground connection is made through ground wire 72b, magnet 38a, channel 28, plate 64 and ground wire 76a, and radio signals are transmitted through coaxial cable 72a, magnet 38b, channel 30, plate 62 and coaxial cable 76b, all of which are encased in shielded cables 72d and 76d. The cable 72d communicates with the antenna and power source and ground on the vehicle while cable 76d is plugged into the transceiver by suitable connections.

To remove the radio and lower bracket 8, the lower bracket 8 is moved in a longitudinal direction relative to the longitudinal axis of the bar magnets 38 such that plates 60, 62 and 64 slide along edges 34 of C-shaped brackets 28, 30 and 32 thus removing the radio.

It should be readily apparent that all electrical connection, i.e., antenna, power, ground, and speakers are made through the magnetic connectors assuring constant electrical connections without external connections to the transceiver or other electronic device.

From the foregoing it should be readily apparent that the embodiment hereinbefore described accomplishes the objects of the invention hereinbefore discussed.

It should be appreciated that other and further embodiments of the invention may be devised without departing from the basic concept thereof.

Having described my invention, I claim:

1. Means for detachably and electrically connecting an electronic device in a vehicle comprising: a first support arranged for attachment to a vehicle; first, second and third magnetic means attached to the support; power means attached to the first magnetic means; ground means attached to the second magnetic means; antenna signal means attached to the third magnetic means; a second support arranged for attachment to an electronic device; first, second, and third magnetically attracting means attached to the second support; said first, second, and third magnetic means being arranged for attachment to the respective first, second and third magnetically attracting means to provide electrical connection therebetween corresponding to the electrical connections to the first, second, and third magnetic means; first, second, and third electrical connector means connected to the first, second and third magnetically attracting means, means connecting the first, second, and third connector means to a power supply, ground and antenna signal connections in the electronic device.

2. The combination called for in claim 1 wherein the magnetic means comprises a magnet.

3. The combination called for in claim 2 with the addition of: first, second and third C-shaped channels, each channel having a magnet secured therein.

4. The combination called for in claim 1 wherein the magnetically attracting means comprises first, second and third plates composed of ferrous material.

5. The combination called for in claim 1 with the addition of: first, second and third C-shaped metal channels secured to said first support having the magnetic means disposed therein; and wherein the first, second and third magnetically attracting means comprises first, second and third plates secured to the second support member composes of ferrous material, and said metal plates having a thickness approximately two times the thickness of the C-shaped metal channels.

6. The combination called for in claim 1 wherein the first support comprises a substantially flat rectangular member having downwardly depending sides formed on opposed sides of the flat member, said flat member having downwardly depending spaced partitions formed between the side channels to receive the first, second, and third magnetic means therein.

7. The combination called for in claim 6 wherein the second support comprises: a substantially flat, rectangular member having a width less than the width between the downwardly depending side members of the first support member such that second member slides into and is aligned within the side members of the first support member.

8. The combination called for in claim 1 with the addition of: channels formed in the first support member to receive said power means, ground means, and antenna signal means; and channels formed in the second support member to receive first, second and third electrical connector means.

9. The combination called for in claim 1 wherein the first, second and third magnetic means comprise: channels composed of magnetizable material, each of said channels being arranged to contact said magnetically attracting means; and magnets secured in each channel to magnetize each channel, said magnets being spaced from the magnetically attracting means when the first and second supports are engaged such that electrical contact is made through said channels and magnetically attracting means.

10. Means for detachably and electrically connecting an electronic device in a vehicle comprising: a first support arranged for attachment to the vehicle; a second support member arranged for attachment to an electronic device; at least three magnetic means attached to the first support; at least three magnetically attracting means attached to the second support arranged to contact the magnetic means to detachably attach the first and second support members together; signal conductor means connected to one of the magnetic means and the vehicle; signal conductor means connected between one of the magnetically attracting means and the electronic device; electrical power connection means attached to two of the magnetic means and arranged for attachment to the electrical system in the vehicle; and electrical power connection means attached to two of the magnetically attracting means aligned with the two corresponding magnetic means and arranged for attachment to the electrical supply means in the electronic device.

* * * * *